US010904311B1

(12) United States Patent
Surazski et al.

(10) Patent No.: US 10,904,311 B1
(45) Date of Patent: Jan. 26, 2021

(54) MANAGEMENT OF MEDIA QUALITY FOR A COLLABORATION SESSION

(71) Applicant: Fuze, Inc., Boston, MA (US)

(72) Inventors: Luke Surazski, San Jose, CA (US); Clement Wehrung, Paris (FR)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 16/456,690

(22) Filed: Jun. 28, 2019

(51) Int. Cl.
*G06F 15/16* (2006.01)
*H04L 29/06* (2006.01)
*G06F 15/173* (2006.01)

(52) U.S. Cl.
CPC .......... *H04L 65/80* (2013.01); *H04L 65/1066* (2013.01); *H04L 65/403* (2013.01)

(58) Field of Classification Search
CPC .... H04L 65/80; H04L 65/403; H04L 65/1066
USPC ................................................. 709/224, 217
See application file for complete search history.

(56) References Cited

U.S. PATENT DOCUMENTS

| 2017/0086090 A1* | 3/2017 | Sharma | H04W 28/0268 |
| 2017/0323211 A1* | 11/2017 | Bencke | G06Q 10/0639 |
| 2020/0106708 A1* | 4/2020 | Sleevi | H04L 47/125 |

\* cited by examiner

*Primary Examiner* — Karen C Tang
(74) *Attorney, Agent, or Firm* — McDermott Will & Emery LLP

(57) ABSTRACT

Methods and systems for managing media quality of a collaboration are provided. In one aspect, a method includes determining whether first and at least second clients are associated with a first and second identified location, respectively, that are associated with a first set of discovered constraints calculated from monitoring first parameters of at least one previous collaboration session associated with the first identified location and with a second set of discovered constraints calculated from monitoring second parameters of at least one previous collaboration session associated with the second identified location, respectively. The method also includes, in response to determining that the clients are associated with the identified locations, respectively, establishing a collaboration session at an initial state between the clients, wherein session constraints corresponding to the initial state are applied to media parameters of the collaboration session and are based on at least the sets of discovered constraints.

20 Claims, 6 Drawing Sheets

MANAGEMENT OF MEDIA QUALITY FOR A COLLABORATION SESSION

TECHNICAL FIELD

The present disclosure generally relates to communication systems, and more specifically relates to improving management of media quality of collaboration sessions.

BACKGROUND

In certain communication systems, a collaboration session will be initiated at an arbitrary initial state and without any constraints to be applied to the media parameters. During such collaboration sessions without any constraints, the media parameters may continually cycle through upgrades (i.e., when media parameter conditions are good) and downgrades (i.e., when the media parameter conditions are bad or failed), which may lead to overall lower quality of user experience and possibly lead to severe deterioration of the collaboration session. In some other communication systems, for example, a threshold may be set such that a predetermined number of failures will prevent any further upgrades of the media parameters, which may prevent the collaboration session from reaching an optimal state. In certain other communication systems, constraints to the media parameters may be manually set at a maximum value, which may be optimal for one specific scenario, but not ideal for other scenarios such that the maximum value needs to manually set for each specific scenario. Moreover, the constraints to the media parameters that are manually set at the maximum value may only be specific to a particular user and must be calculated for other users. In many typical communication systems, recommendations of the media parameters are made during the collaboration session based on current estimates and errors discovered during the collaboration session, which may generally lead to temporary issues and quality degradations related to, for example, overloaded bandwidth by multiple streams of various media such as for cameras, received or shared screens, and audio, and possibly reaching previously identified limits and constraints.

The description provided in the background section should not be assumed to be prior art merely because it is mentioned in or associated with the background section. The background section may include information that describes one or more aspects of the subject technology.

SUMMARY

The disclosed system and method leverages analyzed data including, but not limited to, location, previously reported application and network performance, to automatically provide optimized and/or recommended capabilities for real-time communications and to improve media quality and user experience in subsequent collaboration sessions. The disclosed system and method utilizes environmental variables in determining constraints and can generalize such determined constraints to groups of users associated with an identified location based on shared correlated properties. The disclosed system and method can initiate a collaboration session between multiple clients at an initial state such that constraints are applied to media parameters in which the constraints are based on at least previously discovered constraints that were discovered in prior collaboration sessions associated with the multiple clients. Moreover, the discovered constraints are correlated and associated to a particular location such that the discovered constraints can be applied during any collaboration session involving a client associated with that particular location.

The disclosed methods and systems provide for managing media quality of a collaboration. In one aspect of the present disclosure, a computer-implemented method is described that includes receiving a collaboration request from a first client. The computer-implemented method also includes identifying at least a second client associated with the collaboration request. The computer-implemented method also includes determining whether the first client is associated with a first identified location, wherein the first identified location is associated with a first set of discovered constraints calculated from monitoring first parameters of at least one previous collaboration session associated with the first identified location. The computer-implemented method also includes determining whether the at least second client is associated with a second identified location, wherein the second identified location is associated with a second set of discovered constraints calculated from monitoring second parameters of at least one previous collaboration session associated with the second identified location. The computer-implemented method also includes, in response to determining that the first client is associated with the first identified location and that the at least second client is associated with the second identified location, establishing a collaboration session at an initial state between the first client and the at least second client, wherein session constraints corresponding to the initial state are applied to media parameters corresponding to media of the collaboration session and are based on at least the first set of discovered constraints and the second set of discovered constraints.

According to certain aspects of the present disclosure, a system is provided that includes a memory comprising instructions and one or more processors configured to execute the instructions to identify at least a second client associated with the collaboration request. The one or more processors also execute instructions to determine whether the first client is associated with a first identified location, wherein the first identified location is associated with a first set of discovered constraints calculated from monitoring first parameters of at least one previous collaboration session associated with the first identified location. The one or more processors also execute instructions to determine whether the at least second client is associated with a second identified location, wherein the second identified location is associated with a second set of discovered constraints calculated from monitoring second parameters of at least one previous collaboration session associated with the second identified location. The one or more processors also execute instructions to, in response to determining that the first client is associated with the first identified location and that the at least second client is associated with the second identified location, establish a collaboration session at an initial state between the first client and the at least second client, wherein session constraints corresponding to the initial state are applied to media parameters corresponding to media of the collaboration session and are based on at least the first set of discovered constraints and the second set of discovered constraints. The one or more processors also execute instructions to identify a change of the media during the collaboration session. The one or more processors also execute instructions to determine whether the change of the media corresponds to the first set of discovered constraints and the second set of discovered constraints. The one or more processors also execute instructions to, in response to determining the change of the media corresponds to the first set of discovered constraints and the second set of discovered constraints, adjust the session constraints to the media parameters to correspond to the change of the media based on at least the first set of discovered constraints and the second set of discovered constraints.

In yet another aspect, a non-transitory machine-readable storage medium comprising machine-readable instructions for causing one or more processors to execute a method. The method includes receiving a collaboration request from a first client. The method also includes identifying at least a second client associated with the collaboration request. The method also includes determining whether the first client is associated with a first identified location, wherein the first identified location is associated with a first set of discovered constraints calculated from monitoring first parameters of at least one previous collaboration session associated with the first identified location. The method also includes determining whether the at least second client is associated with a second identified location, wherein the second identified location is associated with a second set of discovered constraints calculated from monitoring second parameters of at least one previous collaboration session associated with the second identified location. The method also includes, in response to determining that the first client is associated with the first identified location and that the at least second client is associated with the second identified location, establishing a collaboration session at an initial state between the first client and the at least second client, wherein session constraints corresponding to the initial state are applied to media parameters corresponding to media of the collaboration session and are based on at least the first set of discovered constraints and the second set of discovered constraints. The method also includes identifying a change of the media during the collaboration session. The method also includes determining whether the change of the media corresponds to the first set of discovered constraints and the second set of discovered constraints. The method also includes, in response to determining the change of the media corresponds to the first set of discovered constraints and the second set of discovered constraints, adjusting the session constraints to the media parameters to correspond to the change of the media based on at least the first set of discovered constraints and the second set of discovered constraints. The method also includes, in response to determining the change of the media does not correspond to the first set of discovered constraints and the second set of discovered constraints, analyzing the media parameters corresponding to the change of the media. The method also includes updating the first set of discovered constraints and the second set of discovered constraints with the analyzed media parameters.

In yet another aspect, a system is described that includes a means for receiving a collaboration request from a first client. The means for receiving a collaboration request also includes identifying at least a second client associated with the collaboration request. The means for receiving a collaboration request also includes determining whether the first client is associated with a first identified location, wherein the first identified location is associated with a first set of discovered constraints calculated from monitoring first parameters of at least one previous collaboration session associated with the first identified location. The means for receiving a collaboration request also includes determining whether the at least second client is associated with a second identified location, wherein the second identified location is associated with a second set of discovered constraints calculated from monitoring second parameters of at least one previous collaboration session associated with the second identified location. The means for receiving a collaboration request also includes, in response to determining that the first client is associated with the first identified location and that the at least second client is associated with the second identified location, establishing a collaboration session at an initial state between the first client and the at least second client, wherein session constraints corresponding to the initial state are applied to media parameters corresponding to media of the collaboration session and are based on at least the first set of discovered constraints and the second set of discovered constraints.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system and method can initiate a collaboration session between multiple clients at an initial state such that constraints are applied to media parameters in which the constraints are based on at least previously discovered constraints that were discovered in prior collaboration sessions associated with the multiple clients. For example, an end user associated with a desktop computer can be joined to a video call meeting with another end user associated with a mobile phone. At the start of the video call, an initial state is set that applies a constraint, such as a maximum upper bound limit, on the resolution of the video. This constraint is based at least on an aggregation of previously discovered time-based and location-based constraints that are associated with locations of the desktop computer and the mobile phone. As the constraint is associated with a particular location, it can be applied to another subsequent video call meeting that may include a different end user joining at that same particular location.

The disclosed system provides an improvement to computer functionality that is integrated into a practical application. The disclosed system addresses a technical problem tied to computer technology and arising in the realm of computer networks, namely the technical problem of degradations in media quality during real-time communication sessions. The disclosed system solves this technical problem by reducing media quality degradation issues in a proactive manner by preventing the reaching of maximum level media parameters during the real-time communication sessions, which may negatively impact the quality of the session. As such, the disclosed system improves bandwidth usage during real-time communication sessions.

Example System Architecture

Figure 1:
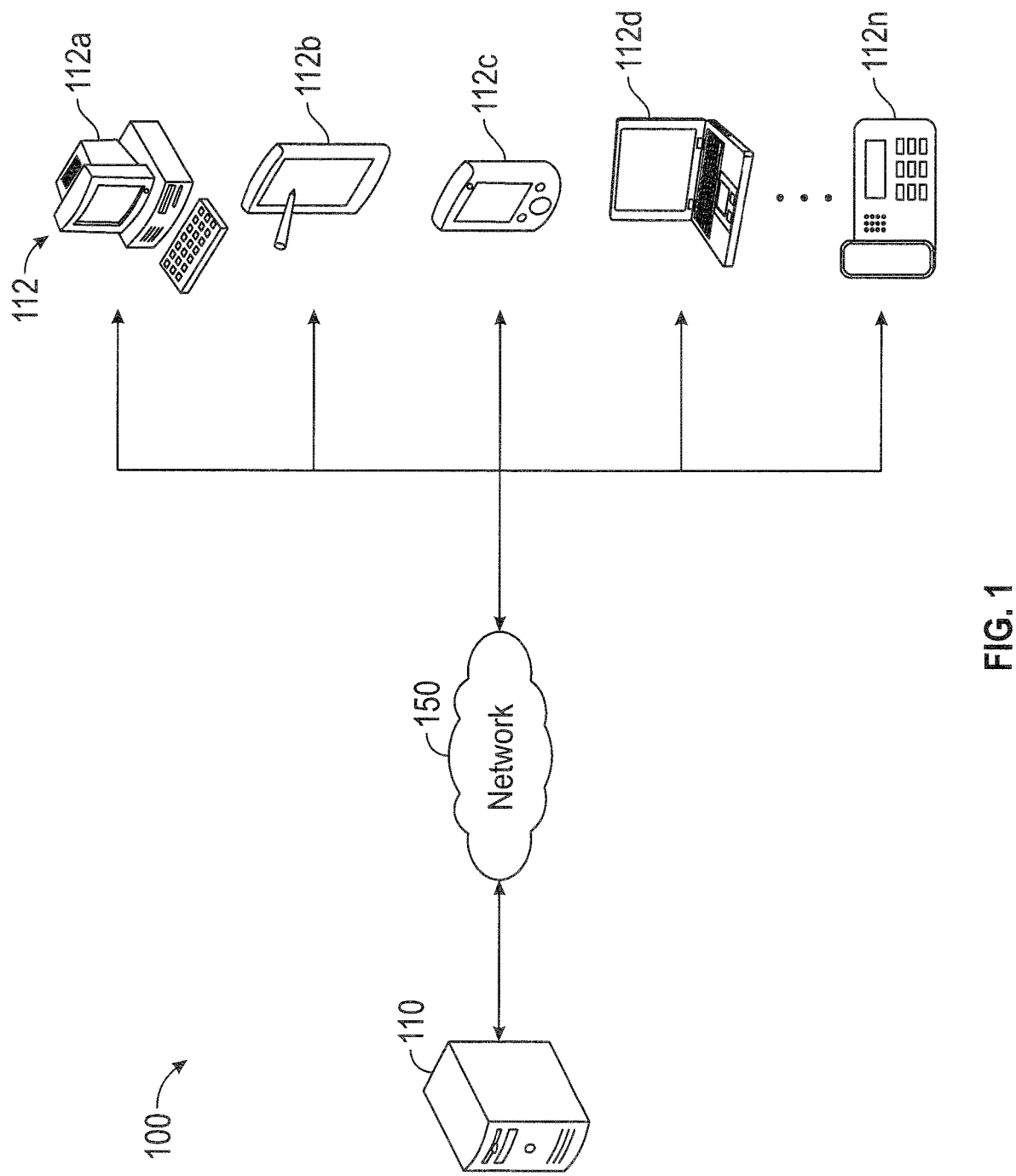
FIG. 1 illustrates an example architecture for managing media quality of a collaboration, according to certain aspects of the disclosure.

FIG. 1 illustrates an example architecture 100 for managing media quality of a collaboration session. The architecture 100 includes one or more servers 110 and one or more clients 112 connected over a network 150.

The server 110 is configured to host a platform 210 (see FIG. 2), such as, for example, a communication platform for managing media quality of a collaboration session between the one or more clients 112. The collaboration sessions include real-time interactive communication methods of media including, but not limited to, audio calls, video conferencing, screen sharing, and combinations thereof. The server 110 is also configured to host real-time services 212 (see FIG. 2), a raw experience store 214 (see FIG. 2), and a constraint store 216 (see FIG. 2). The server 110 may be any device comprising an appropriate processor, memory, and communications capability for hosting the platform 210, the real-time services 212, the raw experience store 214, and the constraint store 216. For purposes of load balancing, a plurality of servers 110 may host the platform 210, the real-time services 212, the raw experience store 214, and the constraint store 216. For example, in certain aspects, the platform 210, the real-time services 212, the raw experience store 214, and the constraint store 216 can be hosted on separate servers. In certain aspects, one or more of the server 110 can be a cloud-computing server of an infrastructure-as-a-service (IaaS), and be able to support a system-as-a-service (PaaS) and software-as-a-service (SaaS) services.

The disclosed system is configured to monitor media parameters (i.e., experience events) of clients, such as the clients 112, during collaboration sessions and analyze those monitored media parameters into aggregated discovered constraints that are categorized by criteria such as, but not limited to, time of day, day of week, and location. The location can be any defined area such as, but not limited to, an office building, a business building, a customer area, a customer shared area, a shared internet service provider (ISP), a home, a sector of a city, a city, a state, a country, and the like. The disclosed system can, for example, establish a subsequent collaboration session at an initial state based on the discovered constraints associated to a corresponding identified location, as will be explained in more detail below.

The one or more clients 112, including, for example, clients 112a, 112b, 112c, 112d, . . . 112n, can be any suitable device that may perform audio and/or video communications such as, but not limited to, desktop computers, mobile computers, tablet computers (e.g., including e-book readers), mobile devices (e.g., a smartphone or PDA), desktop phones, Public Switch Telephone Network (PSTN) phones, Voice over Internet Protocol (VoIP) phones, and/or other devices having appropriate embedded processor, memory, and communications capabilities for accessing resources on the network 150. Each client of the one or more clients 116 is configured to host a web application 215 (see FIG. 2) and/or a mobile application 217. The one or more clients 112 may include touchscreens, pen digitizers, or other devices for receiving input from the hands of end users such as a first end user 218 and a second end user 220 (see FIG. 2).

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network 150 may be wired or wireless.

Illustration of Method for Managing Media Quality of a Collaboration Session

Figure 2:
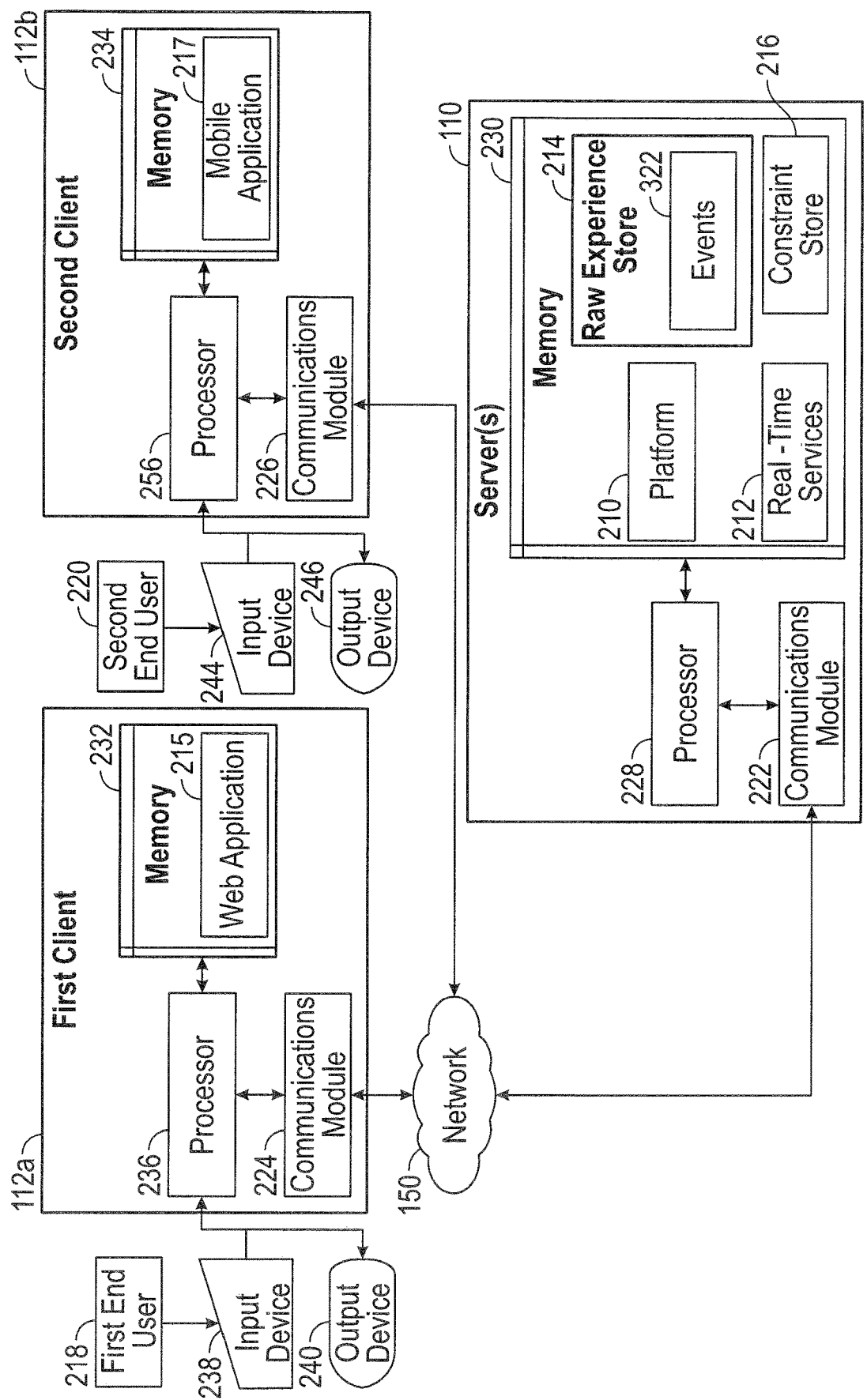
FIG. 2 is a block diagram illustrating an example server(s) and client(s) in the architecture of FIG. 1, according to certain aspects of the disclosure.

FIG. 2 is a block diagram illustrating an example system 200 comprising the one or more servers 110 and the one or more clients 112, such as a first client 112a and a second client 112b, shown in the architecture 100 of FIG. 1, according to certain aspects of the disclosure.

In this example, the one or more servers 110, the first client 112a, and the second client 112b can be connected over the network 150 via respective communications modules 222, 224, 226. The communications modules 222, 224, 226 are configured to interface with the network 150 to transmit and receive information, such as data, requests, responses, and commands to other devices on the network 150. In certain aspects, the communications modules 222, 224, 226 can be, for example, modems, Ethernet cards, and/or other suitable communications hardware/software.

The one or more servers 110 includes a processor 228, the communications module 222, and a memory 230 that includes the platform 210, the real-time services 212, the raw experience store 214, and the constraint store 216. The processor 228 of the one or more servers 110 is configured to execute instructions, such as instructions physically coded into the processor 228, instructions received from software in the memory 230, instructions delivered from a remote memory, or a combination thereof. In general, the processor 228 of the one or more servers 110 is configured to receive user input, such as from the first end user 218 and the second end user 220, for example, accessing the platform 210 over the network 150 using either the web application 215 in a memory 232 of the first client 112a or the mobile application 217 in a memory 234 of the second client 112b. For example, the processor 228 of the one or more servers 110 is configured to execute instructions from the platform 210 to receive a collaboration request from the first client 112a via the first end user 218 to collaborate with the second end user 220 associated with the second client 112b. The processor 228 of the one or more servers 110 is configured to identify at least a second client, such as the second client 112b, associated with the collaboration request.

Figure 3A:
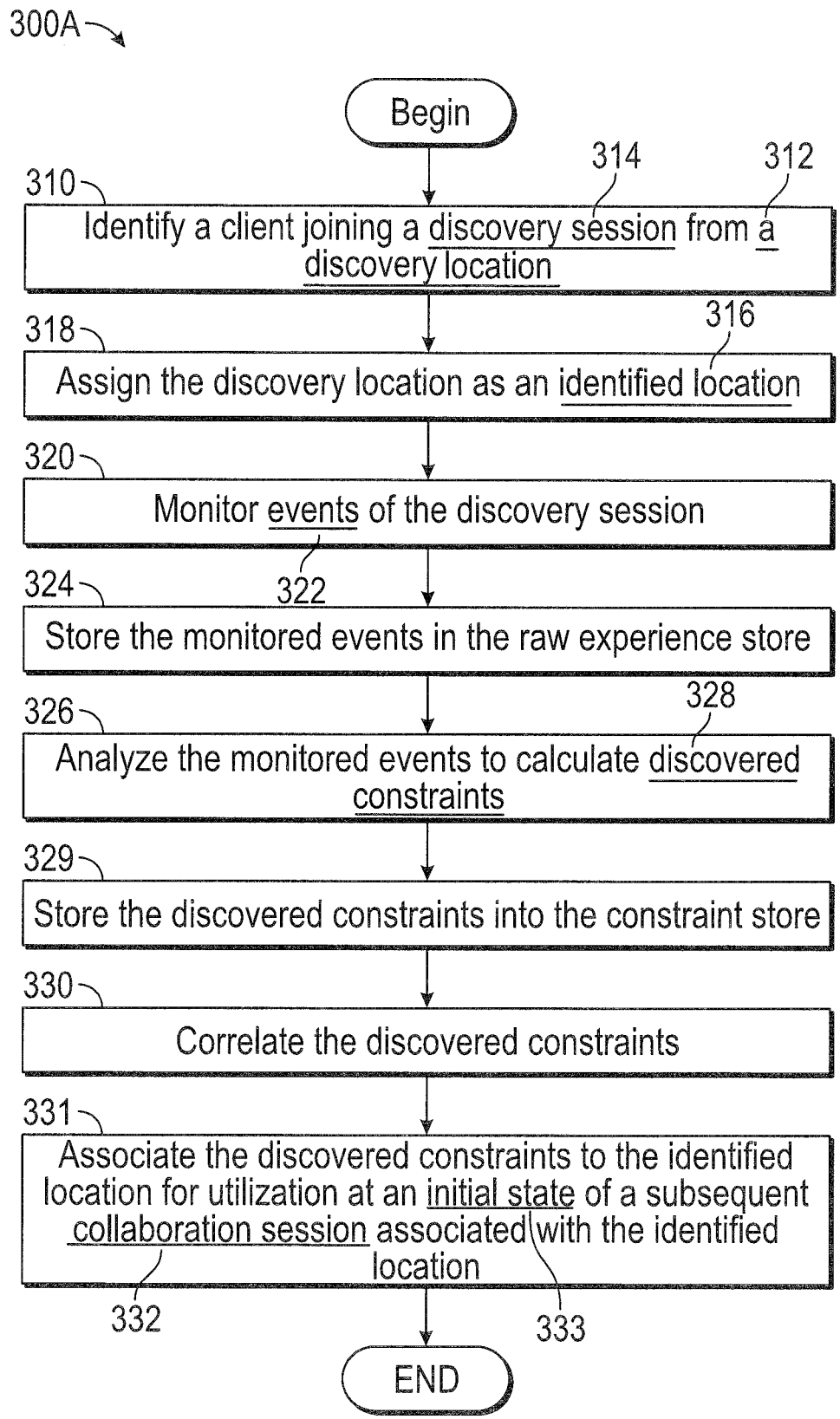
FIG. 3A illustrates an example process for creating media constraints for utilization with initial states of collaboration sessions using the example server(s) and client(s) of FIG. 2.
Figure 3B:
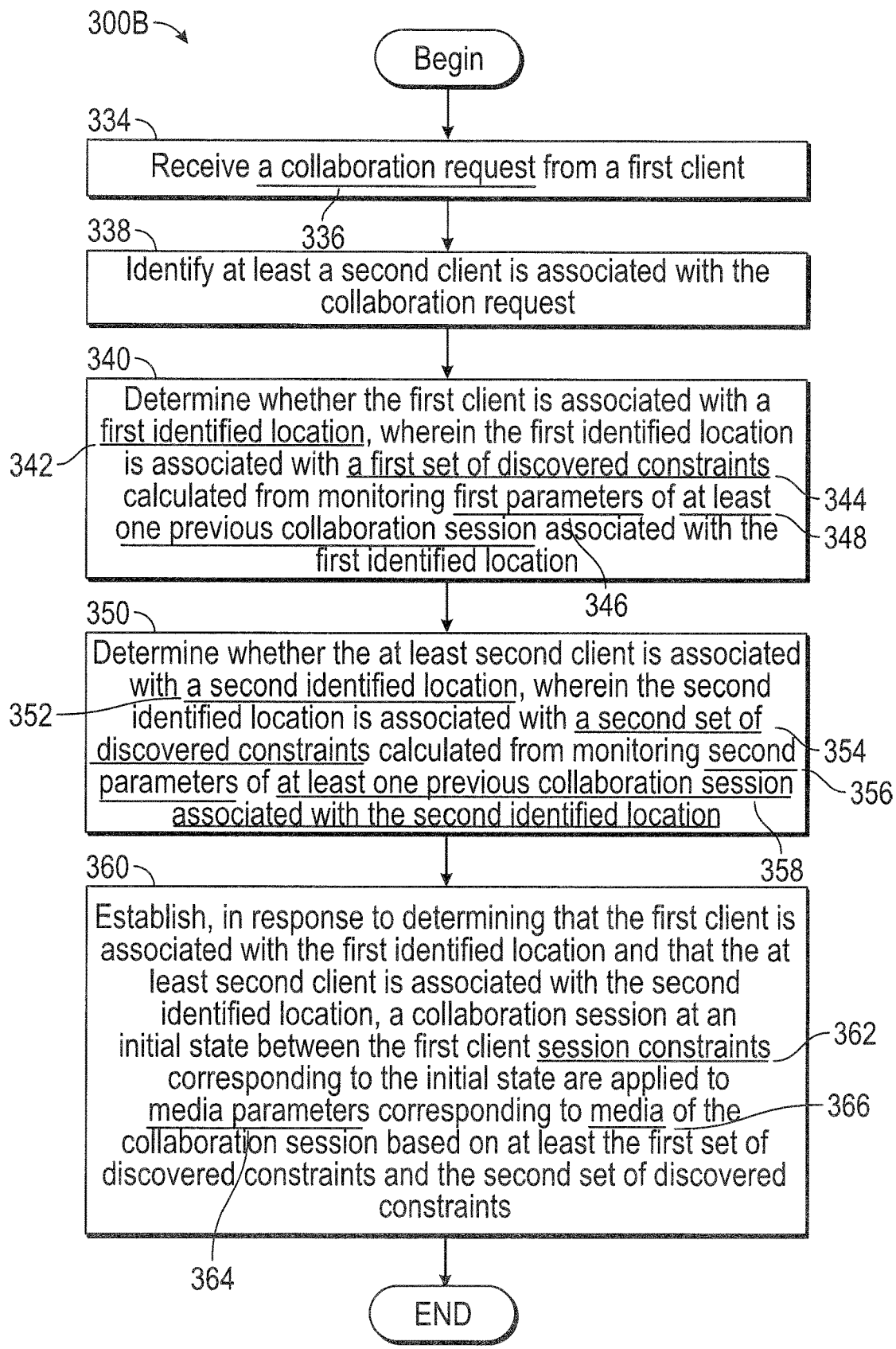
FIG. 3B illustrates an example process for managing media quality of a collaboration session using the example server(s) and client(s) of FIG. 2.

The processor 228 of the one or more servers 110 is also configured to execute instructions from the platform 210 to determine whether the first client 112a is associated with a first identified location 342 (see FIG. 3B) that is associated with a first set of discovered constraints 344 (see FIG. 3B). The processor 228 of the one or more servers 110 is also configured to execute instructions from the platform 210 to monitor first parameters 346 (see FIG. 3B) of at least one previous collaboration session 348 (see FIG. 3B) associated with the first identified location 342. The processor 228 of the one or more servers 110 is also configured to execute instructions from the platform 210 to calculate the first set of discovered constraints 344 by monitoring the first parameters 346 of the at least one previous collaboration session 348 associated with the first identified location 342. The first parameters 346 that can be monitored include, but are not limited to, video retransmission ratios, screen share retransmission ratios, audio packet loss ratios, video packet loss ratios, audio packet concealment ratios, time of frozen screen share, time of frozen video, video I-frame requests, audio standard deviations from fixed rate, time of audioless-ness, amount of downgrades during the at least one previous collaboration session, end user experience scores, end user experience score categories, and total available bandwidth during the at least one previous collaboration session. In certain aspects, the first set of discovered constraints 344 are calculated from monitoring differential updates of the first parameter 346s, for a predetermined number of sessions, of the at least one previous collaboration session 348 associated with the first identified location 342.

The processor 228 of the one or more servers 110 is also configured to execute instructions from the platform 210 to determine whether the at least second client, such as the second client 112b, is associated with a second identified location 352 (see FIG. 3B) that is associated with a second set of discovered constraints 354 (see FIG. 3B). The processor 228 of the one or more servers 110 is also configured to execute instructions from the platform 210 to monitor second parameters 356 (see FIG. 3B) of at least one previous collaboration session 348 (see FIG. 3B) associated with the second identified location 352. The processor 228 of the one or more servers 110 is also configured to execute instructions from the platform 210 to calculate the second set of discovered constraints 354 by monitoring the second parameters 356 of the at least one previous collaboration session 358 associated with the second identified location 352.

The second parameters 356 that can be monitored include, but are not limited to, video retransmission ratios (i.e., percentage of packets needed to be retransmitted by the source client to the recipient client), screen share retransmission ratios (i.e., percentage of packets needed to be retransmitted by the source client to the recipient client), audio packet loss ratios (i.e., percentage of packets not received by the recipient client), video packet loss ratios (i.e., percentage of packets not received by the recipient client), audio packet concealment ratios (i.e., percentage of audio needed to be reconstructed using packet loss concealment), time of frozen screen share (i.e., number of seconds or percentage of time that the screen share is frozen), time of frozen video (i.e., number of seconds or percentage of time that the video is frozen), video I-frame requests (i.e., number of I-frame requests per second of video), audio standard deviations from fixed rate (i.e., for constant bitrate audio streams, the standard deviation away from the expected bitrate for the stream), time of audioless-ness (i.e., number of seconds or percentage of time that clients do not receive audio), amount of downgrades to media per time interval (i.e., number of times that media needs to be adjusted down due to network impairments per second), end user experience scores (i.e., score attributed to the collaboration session by the end user), end user experience score categories (i.e., if a collaboration session has a low score, then the end user may also select specific impairments that were experienced during the collaboration session such as, but not limited to, low resolution video, choppy audio, delayed video, and the like), and total available bandwidth (i.e., estimate of the available bandwidth calculated during the collaboration session).

The processor 228 of the one or more servers 110 is also configured to execute instructions from the platform 210 to, in response to determining that the first client 112a is associated with the first identified location 342 and that the at least second client, such as the second client 112b, is associated with the second identified location 352, establish a collaboration session 332 (see FIG. 3A) at an initial state 333 (see FIG. 3A) between the first client 112a and the second client 112b. The processor 228 of the one or more servers 110 is also configured to execute instructions from the platform 210 to initially apply session constraints 362 (see FIG. 3B), which correspond to the initial state 333, to media parameters 364 (see FIG. 3B) corresponding to media 366 (see FIG. 3B) of the collaboration session 332.

The session constraints 362 are based on at least the first set of discovered constraints 344 and the second set of discovered constraints 354. For example, the session constraints 362 corresponding to the initial state 333 that are applied to the media parameters 364 can include, but are not limited to, a total average bitrate (i.e., maximum combined bandwidth to use for audio, video, and screen share), a maximum video bitrate (i.e., maximum target bitrate to use for video to limit the size of I-frames that an encoder will generate), a maximum screen share bitrate (i.e., maximum target bitrate to use for screen share to limit the size of I-frames that a encoder will generate), a maximum video resolution (i.e., maximum target resolution to use for video to limit the size of I-frames an encoder will generate), a maximum screen share resolution (i.e., maximum target resolution to use for screen share to limit the size of I-frames an encoder will generate), a maximum video frame rate (i.e., maximum target frame rate to use for video to limit the bitrate of the streams), a maximum screen share frame rate (i.e., maximum target frame rate to use for screen share to limit the bitrate of the streams), audio connection options (i.e., if prior collaboration sessions had poor audio irrespective of parameters a constraint may be placed to connect over the PSTN rather than VoIP), a minimum audio Forward Error Concealment percentage (i.e., for certain audio codecs, limit the minimum amount of redundant data to include in each packet), media mode (i.e., depending on prior collaboration sessions, such as discovery session 314, constrain the session to not allow video or screen share escalation), and the like. In certain aspects, the session constraints 362 corresponding to the initial state 333 are further based on end user experience scores associated with the at least one previous collaboration session 348 associated with the first identified location 342.

The processor 228 of the one or more servers 110 is also configured to, in response to determining a change of the media 366 during the collaboration session 332 corresponds to the first set of discovered constraints 344 and the second set of discovered constraints 354, adjust the session constraints 362 to the media parameters 364 to correspond to the change of the media 366 based on at least the first set of discovered constraints 344 and the second set of discovered constraints 354. A change of the media 366 can include, for example, an escalation from an audio session to an audio plus video session or to an audio plus screen share session. The change of media 366 can include changes of audio, video, screen share, and any combinations thereof. Furthermore, a change of media 366 can also include, for example, increases in streams of each audio, video, screen share, and any combinations thereof (i.e., two video streams to three video streams during a video session).

The processor 228 of the one or more servers 110 is also configured to, in response to determining the change of the media 366 does not correspond to the first set of discovered constraints 344 and the second set of discovered constraints 354, analyze the media parameters 364 corresponding to the change of the media 366. The processor 228 of the one or more servers 110 is also configured to update the first set of discovered constraints 344 and the second set of discovered constraints 354 with such analyzed media parameters 364.

The processor 228 of the one or more servers 110 is also configured to identify the first client 112a as a test candidate. The processor 228 of the one or more servers 110 is also configured to, based on identifying the first client 112a as the test candidate, remove the session constraints 362 associated with the first client 112a for a predetermined period of the collaboration session 332. The processor 228 of the one or more servers 110 is also configured to monitor the media parameters 364 associated with the first client 112a during the predetermined period of the collaboration session 332. The processor 228 of the one or more servers 110 is also configured to update the first set of discovered constraints 344 with such monitored media parameters 364 associated with the first client 112a.

The first client 112a includes a processor 236, the communications module 224, and the memory 232 that includes the web application 215. The first client 112a also comprises an input device 238, such as a keyboard, mouse, and/or another suitable input device, and an output device 240, such as a display, port, transducer, and/or another suitable output device. The processor 236 of the first client 112a is configured to execute instructions, such as instructions physically coded into the processor 236, instructions received from software in the memory 232, instructions delivered from a remote memory, or a combination thereof. In general, the processor 236 of the first client 112a is configured to transmit information, such as data, requests, responses, and commands input to the input device 238, by the first end user 218, for example, to the platform 210 on the one or more servers 110 via the web application 215. Similarly, the processor 236 of the first client 112a is also configured to receive information from the platform 210 on the one or more servers 110 via the web application 215. The processor 236 of the first client 112a is configured to execute instructions from the web application 215 to transmit the collaboration request to the one or more servers 110 to communicate with a particular user such as, for example, the second end user 220 in a collaboration session using a particular media such as, but not limited to, an audio call, a video call, a screen share, and a combination thereof.

The second client 112b includes a processor 256, the communications module 226, and the memory 234 that includes the mobile application 217. The second client 112b also comprises an input device 244, such as a touch screen, a keyboard, mouse, and/or another suitable input device, and an output device 246, such as a display, port, transducer, and/or another suitable output device. The second client 112b is configured to execute instructions, such as instructions physically coded into the processor 256, instruction received from software in the memory 234, instructions delivered from a remote memory, or a combination thereof. In general, the processor 256 of the second client 112b is configured to transmit information, such as data, requests, responses, and commands input to the input device 244, by the second end user 220, for example, to the platform 210 on the one or more servers 110 via the mobile application 217. Similarly, the processor 256 of the second client 112b is also configured to receive information from the platform 210 on the one or more servers 110 via the mobile application 217. The processor 256 of the second client 112b is configured to execute instructions from the mobile application 217 and receive the collaboration request from the one or more servers 110 to communicate with the first end user 218, for example, in a collaboration session using a particular media such as, but not limited to, an audio call, a video call, a screen share, and a combination thereof.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

FIG. 3A illustrates an example process 300A for creating media constraints for utilization with initial states of collaboration sessions using the example one or more servers 110 of FIG. 2. While FIG. 3A is described with reference to the system 200 of FIG. 2, it should be noted that the process steps of FIG. 3A may be performed by other systems having more or fewer components as compared with the system 200 of FIG. 2.

The process 300A begins by proceeding to step 310 when the platform 210 identifies that a client, such as the first client 112a, for example, has joined a collaboration session from a new location or a discovery location 312, which has not yet been associated with any discovered constraints because session parameters associated with collaboration sessions for this particular location have not been monitored and/or analyzed yet into the discovered constraints. In such instances, the collaboration session can also be referred to as a discovery session 314. The discovery location can be associated with an Internet Protocol (IP) address of the client, such as the first client 112a, and can be assigned as an identified location 316, such as the first identified location 342, once the location is known, as illustrated at step 318. At step 320, the platform 210 instructs the processor 228 of the one or more servers 110 to monitor events 322, such as the session parameters, during the discovery session 314. The platform 210 instructs the processor 228 of the one or more servers 110 to store the monitored events 322 or session parameters, such as the first parameters 346, for example, in the raw experience store 214, as illustrated at step 324.

At step 326, the processor 228 analyzes the monitored events 322, such as the first parameters 346, to calculate discovered constraints 328, such as the first set of discovered constraints 344. The processor 228 stores the discovered constraints, as illustrated at step 329, and correlates the discovered constraints, such as the first set of discovered constraints 344, by time of day, day of week, and the identified location, into the constraint store 216, as illustrated at step 330. As subsequent monitored events 322 are stored in the raw experience store 214 during the discovery session 314, the processor 228 continues to analyze the subsequent monitored events 322 and update the constraint store 216 with corresponding discovered constraints. While the above process has been described for a single discovery session 314, it should be understood that a discovery session 314, in certain aspects, can be conducted over a predetermined number of sessions in order that the discovered constraints 328 can be more robust by analyzing the monitored events 322 at, for example, a predetermined time range, a predetermined day, different media usages, and changes between different media usages, and correlating such analyzed data. At step 331, the processor 228 associates the discovered constraints 328 to the identified location 316 such that, in a subsequent collaboration session 332 associated with the identified location 316, the discovered constraints 328 are applied to an initial state 333 of the subsequent collaboration session 332.

FIG. 3B illustrates an example process 300B for managing media quality of a collaboration session using the example one or more servers 110 of FIG. 2. While FIG. 3B is described with reference to the system 200 of FIG. 2, it should be noted that the process steps of FIG. 3B may be performed by other systems having more or fewer components as compared with the system 200 of FIG. 2.

The process 300B begins by proceeding to step 334 when the platform 210 receives a collaboration request 336 from a client, such as the first client 112a. At step 338, the platform 210 identifies at least a second client, such as the second client 112b, is associated with the collaboration request 336. At step 340, the platform 210 instructs the processor 228 to determine whether the first client 112a is associated with a first identified location 342, wherein the first identified location 342 is associated with a first set of discovered constraints 344, such as the discovered constraints 328, for example. The first set of discovered constraints 344 are calculated from monitoring first parameters 346 of at least one previous collaboration session 348, such as the discovery session 314, associated with the first identified location 342.

As illustrated at step 350, the platform 210 instructs the processor 228 to determine whether the at least second client, such as the second client 112b, is associated with a second identified location 352, wherein the second identified location 352 is associated with a second set of discovered constraints 354 calculated from monitoring second parameters 356 of at least one previous collaboration session 358 associated with the second identified location 352. At step 360, the processor 228, in response to determining that the first client 112a is associated with the first identified location 342 and that the at least second client, such as the second client 112b, is associated with the second identified location 352, establishes a collaboration session 332 at an initial state 333 between the first client 112a and the at least second client, wherein session constraints 362 corresponding to the initial state 333 are applied to media parameters 364 corresponding to media 366 of the collaboration session 332 based on at least the first set of discovered constraints 344 and the second set of discovered constraints 354.

Figure 4A:
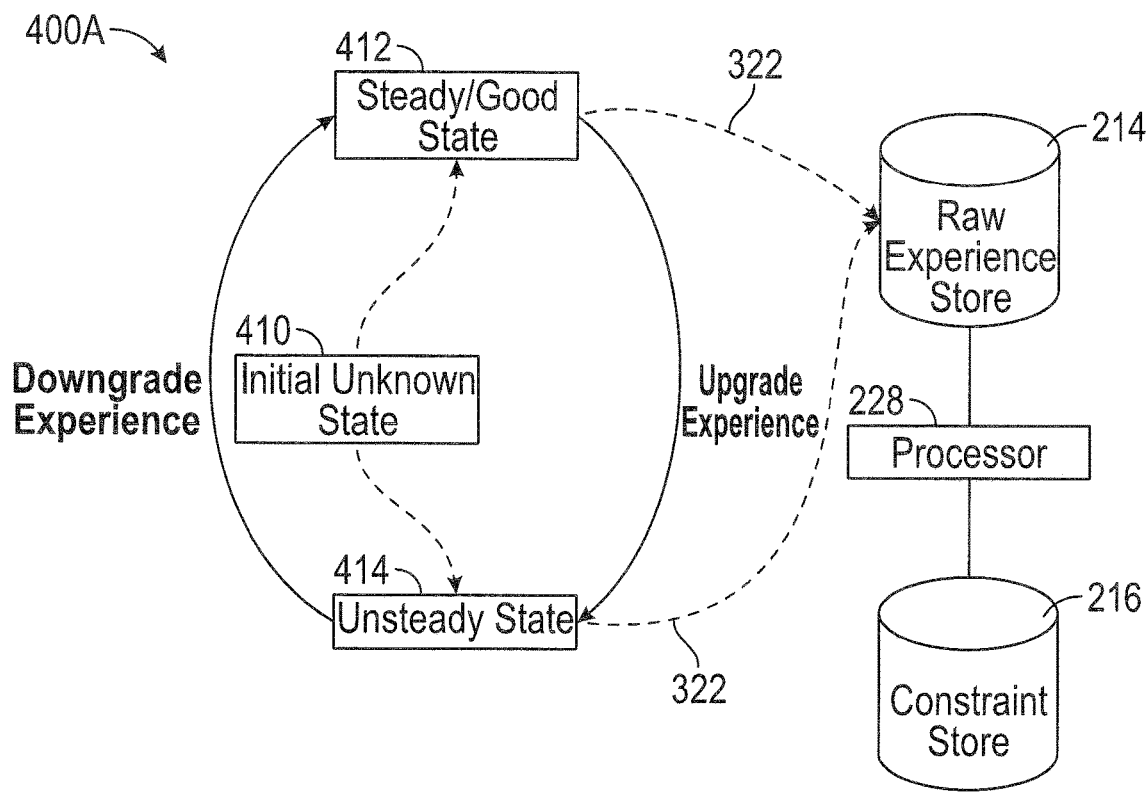
FIGS. 4A-4B are example flow diagrams associated with the example processes of FIGS. 3A-3B.

An example process, such as a process including the process 300A and the process 300B of FIGS. 3A and 3B, respectively, will now be described in reference to example flow diagrams illustrated in FIGS. 4A-4B. For example, as illustrated in diagram 400A of FIG. 4A, a client, such as the first client 112a, has joined a collaboration session, which, at this point, is considered a discovery session 314 because the first client 112a is joining from a new location (i.e., a discovery location 312), which has not yet been associated with any discovered constraints 328. After the new location is identified as a discovery location 312, the discovery location 312 is assigned as an identified location 316 since the location is now known. This discovery session 314 is initiated at an initial unknown state 410 without any associated constraints. As such, without any constraints, the first parameters 346 associated with the first client 112a will be downgraded and upgraded between a steady/good state 412 and an unsteady state 414 as conditions fluctuate during the discovery session 314. The downgrading and upgrading of the first parameters 346 are monitored as events 322 and stored in the raw experience store 214. The processor 228 analyzes the monitored events 322 to calculate the discovered constraints 328 for correlation and storage in the constraint store 216. The discovered constraints 328 are associated to the identified location 316 such that the discovered constraints 328 can be applied to the initial state 333 of a subsequent collaboration session 332 associated with the identified location 316 whether it is with the first client 112a or another client associated with the identified location 316.

Although the identified location 316 is associated with the discovered constraints 328, it should be understood that further discovery sessions 314 associated with the identified location 316 can be selectively chosen to gather and monitor additional events 322 in an unconstrained environment for additional test data under various conditions that may not have been tested yet, such as usage of different media, and at various times, such as time of day and/or day of week. For example, it may be desired that five audio discovery sessions 314 and five video discovery sessions 314 be monitored at specific times of day before the corresponding discovered constraints 328 are utilized for an initial state 333 of a subsequent collaboration session 332 associated with the identified location 316. In certain aspects, a subsequent discovery session 314 associated with the identified location 316 can randomly be monitored in an unconstrained environment to test whether the discovered constraints 328 are still valid or need to be updated. In such aspects, this random monitoring can provide insight on the corresponding environment and may result in relaxing or adjusting the discovered constraints 328. For example, internet services associated with the identified location 316 may have been upgraded such that a higher resolution video may be received. In certain aspects, for example, each application of the discovered constraints 328 will be conducted with probability P, where P is close to 1, and a constraint may be relaxed by margin R with probability (1−P). The outcome will be emitted as an event 322, stored in the raw experience store 214, and calculated to update the discovered constraints 328 in the constraint store 216.

Figure 4B:
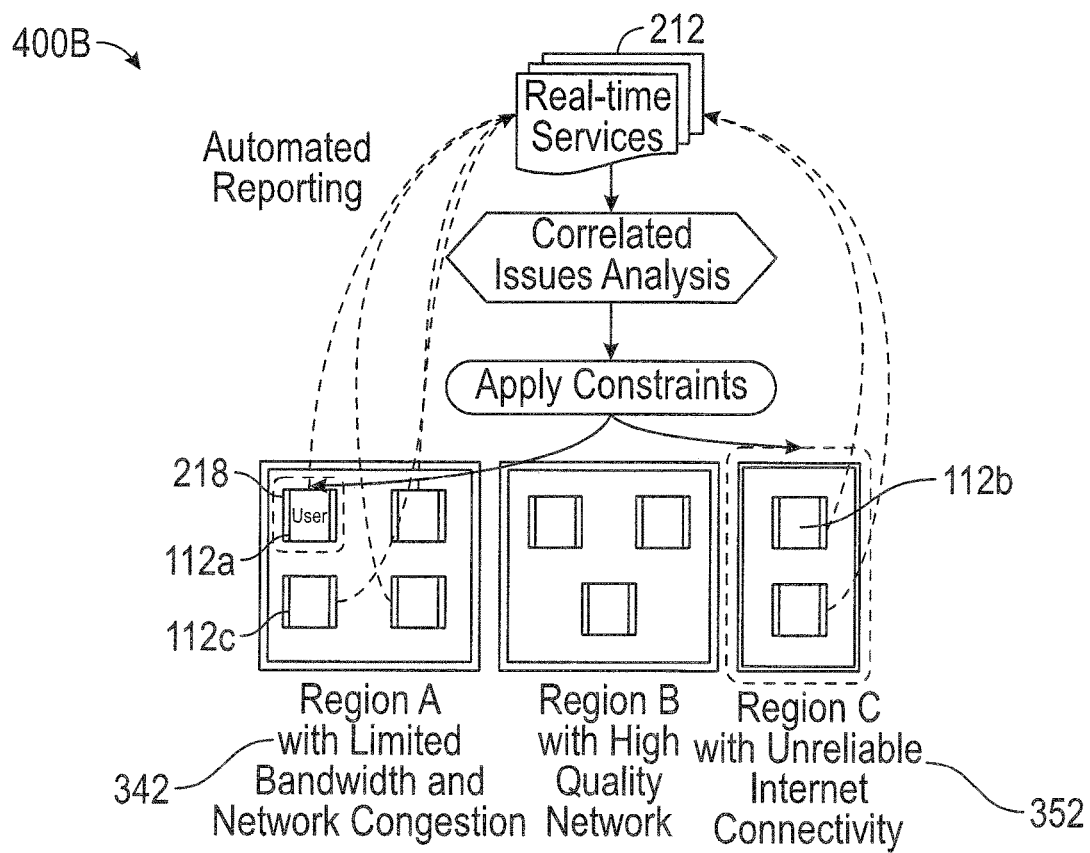

An exemplary subsequent collaboration session 332, in which the discovered constraints 328 are associated with the identified location 316, is illustrated in diagram 400B of FIG. 4B. In this example, the first client 112a is associated with the first identified location 342, which is Region A having limited bandwidth and network congestion. The second client 112b is associated with the second identified location 352, which is Region C having unreliable internet connectivity. For example, this subsequent collaboration session 332 is established as a video session between the first client 112a and the second client 112b at an initial state 333. The initial state 333 corresponds to session constraints 362 that are applied to the video media parameters 364 based on at least the first set of discovered constraints 344 associated with the first identified location 342 and the second set of discovered constraints 354 associated with the second identified location 352.

During this subsequent collaboration session 332 using video media, for example, the first end user 218 associated with the first client 112a escalates from video media to video plus screen share media. The real-time services 212 detects this change and notifies the platform 210 to instruct the processor 228 to identify and apply the session constraints 362 corresponding to the video plus screen share media based on at least the first set of discovered constraints 344 associated with the first identified location 342 and the second set of discovered constraints 354 associated with the second identified location 352.

In a similar example, during the subsequent collaboration session 332 using the video media with the first client 112a and the second client 112b, a third client 112c associated with the first identified location 342 joins the subsequent collaboration session 332. In this example, the real-time services 212 detects this change and notifies the platform 210 to instruct the processor 228 to identify and apply the session constraints 362 corresponding to the additional video stream of the third client 112c based on at least the first set of discovered constraints 344 associated with the first identified location 342 and the second set of discovered constraints 354 associated with the second identified location 352, as the third client 112c is also associated with the first identified location 342.

Hardware Overview

Figure 5:
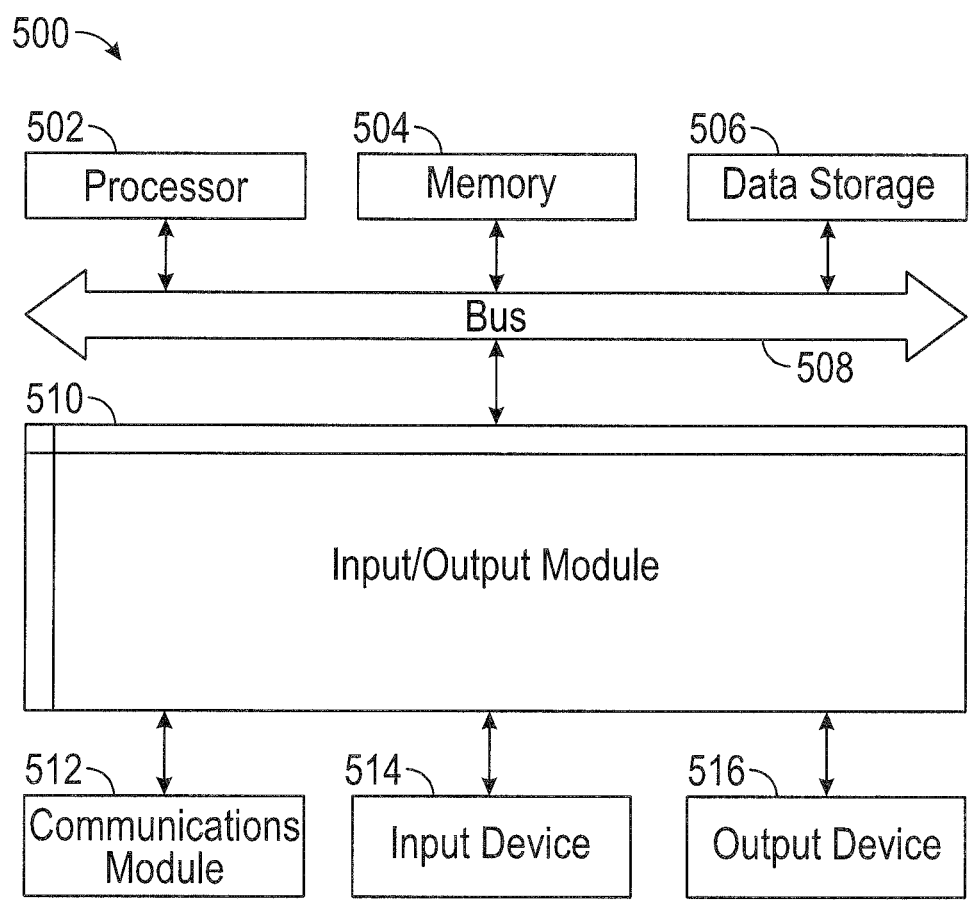
FIG. 5 is a block diagram illustrating an example computer system with which the server and the first and second clients of FIG. 2 can be implemented.

FIG. 5 is a block diagram illustrating an example computer system 500 with which the one or more servers 110 and the one or more clients 112, such as the first client 112a and the second client 112b, of FIG. 2 can be implemented. In certain aspects, the computer system 500 may be implemented using hardware or a combination of software and hardware, either in a dedicated server, integrated into another computing component, or distributed across multiple computing components.

Computer system 500 (e.g., the one or more servers 110 and the one or more clients 112, such as the first client 112a and the second client 112b) may include a bus 508 and/or another suitable communication mechanism for communicating information, and one or more processors 502 (e.g., processor 228, 236, 256) coupled with the bus 508 for processing information. According to one aspect, the computer system 500 can be a cloud-computing server of an IaaS that is able to support PaaS and SaaS services. According to an example embodiment, the computer system 500 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 500 may be implemented with the one or more processors 502. The one or more processors 502 may comprise a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

The computer system 500 may include, in addition to hardware, code that creates an execution environment for the computer program in question, e.g., code that constitutes processor firmware, a protocol stack, a database management system, an operating system, or a combination of one or more of them stored in an included memory 504 (e.g., memory 230, 232, 234), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 508 for storing information and instructions to be executed by the one or more processors 502. The processor(s) 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may further include secure information. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 504 may also be used for storing temporary variables or other intermediate information during execution of instructions to be executed by the processor(s) 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 238, 244 and output device 240, 246). The input/output module 510 can be any input/output module. Example input/output modules 510 include data ports such as USB ports. In addition, input/output module 510 may be provided in communication with the processor(s) 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. The communications modules 512 (e.g., communications module 222, 224, 226) may comprise networking interface cards, such as Ethernet cards and/or modems.

The components of the system can be interconnected by any form or medium of digital data communication, e.g., a communication network. The communication network (e.g., the network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic, or optical signals that carry digital data streams representing various types of information. The network link typically provides data communication through one or more networks to other data devices. For example, the network link of the communications module 512 may provide a connection through a local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link, and communications module 512. In the Internet example, a server might transmit a requested code for an application program through the Internet, the ISP, the local network, and the communications module 512. The received code may be executed by the processor(s) 502 as it is received, and/or stored in the data storage device 506 for later execution.

In certain aspects, the input/output module 510 is configured to connect to a plurality of devices, such as an input device 514 (e.g., input device 238, 244) and/or an output device 516 (e.g., output device 240, 246). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the one or more servers 110 and the one or more clients 112, such as the first client 112a and the second client 112b can be implemented using the computer system 500 in response to the processor(s) 502 executing one or more sequences of one or more instructions contained in the memory 504. Such instructions may be read into the memory 504 from another machine-readable medium, such as the data storage device 506. Execution of the sequences of instructions contained in the memory 504 causes the processor(s) 502 to perform the process steps described herein. One or more processors in a multi-processing arrangement may also be employed to execute the sequences of instructions contained in the memory 504. The processor(s) 502 may process the executable instructions and/or data structures by remotely accessing the computer program product, for example by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

As mentioned hereinabove, the computing system 500 may include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 506. Volatile media include dynamic memory, such as the memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that include bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for managing media quality of a collaboration, the method comprising:
    receiving a collaboration request from a first client;
    identifying at least a second client associated with the collaboration request;
    determining whether the first client is associated with a first identified location, wherein the first identified location is associated with a first set of discovered constraints calculated from monitoring, for a previous collaboration session associated with the first identified location, a first parameter;
    determining whether the second client is associated with a second identified location, wherein the second identified location is associated with a second set of discovered constraints calculated from monitoring second parameters of at least one previous collaboration session associated with the second identified location;
    establishing, in response to determining that the first client is associated with the first identified location and that the second client is associated with the second identified location, a collaboration session at an initial state between the first client and the second client, wherein session constraints corresponding to the initial state are applied to a media parameter corresponding to media of the collaboration session and are based on at least the first set of discovered constraints and the second set of discovered constraints;
    monitoring, for the media parameter, a differential update; and
    updating the session constraints based on the differential update to prevent the media parameter corresponding to the media of the collaboration session to reach a maximum level.

2. The computer-implemented method of claim 1, wherein the first set of discovered constraints are calculated from monitoring differential updates of the first parameters, for a predetermined number of sessions, of the previous collaboration session associated with the first identified location.

3. The computer-implemented method of claim 1, wherein the previous collaboration session associated with the first identified location is conducted with at least a medium of audio, video, screen share, audio and video, audio and screen share, and video and screen share.

4. The computer-implemented method of claim 1, wherein the first set of discovered constraints are correlated by time of day, day of week, and the first identified location, and the second set of discovered constraints are correlated by time of day, day of week, and the second identified location.

5. The computer-implemented method of claim 1, further comprising:
    adjusting, in response to a change of the media during the collaboration session, the session constraints to the media parameters to correspond to the change of the media based on at least the first set of discovered constraints and the second set of discovered constraints.

6. The computer-implemented method of claim 1, further comprising:
    identifying a change of the media during the collaboration session;

determining whether the change of the media corresponds to the first set of discovered constraints and the second set of discovered constraints;

analyzing, in response to determining the change of the media does not correspond to the first set of discovered constraints and the second set of discovered constraints, the media parameters corresponding to the change of the media; and updating the first set of discovered constraints and the second set of discovered constraints with the media parameters.

7. The computer-implemented method of claim 1, wherein the session constraints corresponding to the initial state are further based on end user experience scores associated with the previous collaboration session associated with the first identified location.

8. The computer-implemented method of claim 1, further comprising:

identifying the first client as a test candidate;

removing, based on identifying the first client as the test candidate, the session constraints associated with the first client for a predetermined period of the collaboration session; and monitoring the media parameters associated with the first client during the predetermined period of the collaboration session.

9. The computer-implemented method of claim 8, further comprising:

updating the first set of discovered constraints with the monitored media parameters associated with the first client.

10. The computer-implemented method of claim 1, wherein the first parameter comprises at least one of video retransmission ratios, screen share retransmission ratios, audio packet loss ratios, video packet loss ratios, audio packet concealment ratios, time of frozen screen share, time of frozen video, video I-frame requests, audio standard deviations from fixed rate, time of audio-less-ness, amount of downgrades during the previous collaboration session, end user experience scores, end user experience score categories, and total available bandwidth during the previous collaboration session.

11. The computer-implemented method of claim 1, wherein the first set of discovered constraints comprises at least one of a total average bitrate, a maximum video bitrate, a maximum screen share bitrate, a maximum video resolution, a maximum screen share resolution, a maximum video frame rate, a maximum screen share frame rate, audio connection options, a minimum audio Forward Error Concealment percentage, and media mode.

12. A system for managing media quality of a collaboration, the system comprising:

a memory comprising instructions; and one or more processors configured to execute the instructions to:

receive a collaboration request from a first client;

identify at least a second client associated with the collaboration request;

determine whether the first client is associated with a first identified location, wherein the first identified location is associated with a first set of discovered constraints calculated from monitoring a first parameter of at least one previous collaboration session associated with the first identified location;

determine whether the at least second client is associated with a second identified location, wherein the second identified location is associated with a second set of discovered constraints calculated from monitoring second parameters of at least one previous collaboration session associated with the second identified location;

establish, in response to determining that the first client is associated with the first identified location and that the at least second client is associated with the second identified location, a collaboration session at an initial state between the first client and the at least second client, wherein session constraints corresponding to the initial state are applied to a media parameter corresponding to media of the collaboration session and are based on at least the first set of discovered constraints and the second set of discovered constraints;

identify a change of the media during the collaboration session;

determine whether the change of the media corresponds to the first set of discovered constraints and the second set of discovered constraints;

adjust, in response to determining the change of the media corresponds to the first set of discovered constraints and the second set of discovered constraints, the session constraints to the media parameter to correspond to the change of the media based on at least the first set of discovered constraints and the second set of discovered constraints;

monitor, for the media parameter, a differential update; and update the session constraints based on the differential update to prevent the media parameter corresponding to the media of the collaboration session to reach a maximum level.

13. The system of claim 12, wherein the one or more processors is further configured to execute the instructions to:

analyze, in response to determining the change of the media does not correspond to the first set of discovered constraints and the second set of discovered constraints, the media parameters corresponding to the change of the media; and update the first set of discovered constraints and the second set of discovered constraints with the media parameters.

14. The system of claim 12, wherein the one or more processors is further configured to execute the instructions to:

identify the first client as a test candidate;

remove, based on identifying the first client as the test candidate, the session constraints associated with the first client for a predetermined period of the collaboration session; and monitor the media parameters associated with the first client during the predetermined period of the collaboration session.

15. The system of claim 14, wherein the one or more processors is further configured to execute the instructions to:

update the first set of discovered constraints with the media parameters associated with the first client.

16. The system of claim 12, wherein the first set of discovered constraints are calculated from monitoring differential updates of the first parameters, for a predetermined number of sessions, of the previous collaboration session associated with the first identified location.

17. The system of claim 12, wherein the first set of discovered constraints are correlated by time of day, day of week, and the first identified location, and the second set of discovered constraints are correlated by time of day, day of week, and the second identified location.

18. The system of claim 12, wherein the session constraints corresponding to the initial state are further based on end user experience scores associated with the previous collaboration session associated with the first identified location.

19. A non-transitory machine-readable storage medium comprising machine-readable instructions for causing a processor to execute a method, the method comprising:
   receiving a collaboration request from a first client;
   identifying at least a second client associated with the collaboration request;
   determining whether the first client is associated with a first identified location, wherein the first identified location is associated with a first set of discovered constraints calculated from monitoring first parameters of at least one previous collaboration session associated with the first identified location;
   determining whether the second client is associated with a second identified location, wherein the second identified location is associated with a second set of discovered constraints calculated from monitoring second parameters of at least one previous collaboration session associated with the second identified location;
   establishing, in response to determining that the first client is associated with the first identified location and that the second client is associated with the second identified location, a collaboration session at an initial state between the first client and the second client, wherein session constraints corresponding to the initial state are applied to a media parameter corresponding to media of the collaboration session and are based on at least the first set of discovered constraints and the second set of discovered constraints;
   identifying a change of the media during the collaboration session;
   determining whether the change of the media corresponds to the first set of discovered constraints and the second set of discovered constraints;
   adjusting, in response to determining the change of the media corresponds to the first set of discovered constraints and the second set of discovered constraints, the session constraints to the media parameters to correspond to the change of the media based on at least the first set of discovered constraints and the second set of discovered constraints;
   analyzing, in response to determining the change of the media does not correspond to the first set of discovered constraints and the second set of discovered constraints, the media parameter corresponding to the change of the media;
   updating the first set of discovered constraints and the second set of discovered constraints with the media parameter; and
   updating the session constraints based on the change of the media to prevent the media parameter to reach a maximum level.

20. The non-transitory machine-readable storage medium of claim 19, wherein the method further comprises:
   identifying the first client as a test candidate;
   removing, based on identifying the first client as the test candidate, the session constraints associated with the first client for a predetermined period of the collaboration session; and
   monitoring the media parameter associated with the first client during the predetermined period of the collaboration session.

\* \* \* \* \*